(12) United States Patent
Miller et al.

(10) Patent No.: US 9,632,830 B1
(45) Date of Patent: Apr. 25, 2017

(54) CACHE RETENTION ANALYSIS SYSTEM AND METHOD

(71) Applicant: Rockwell Collins, Inc., Cedar Rapids, IA (US)

(72) Inventors: David A. Miller, Swisher, IA (US); J. Perry Smith, Shellsburg, IA (US); David C. Matthews, Shanghai (CN)

(73) Assignee: Rockwell Collins, Inc., Cedar Rapids, IA (US)

( * ) Notice: Subject to any disclaimer, the term of this patent is extended or adjusted under 35 U.S.C. 154(b) by 43 days.

(21) Appl. No.: 14/949,413

(22) Filed: Nov. 23, 2015

Related U.S. Application Data

(63) Continuation of application No. 14/820,099, filed on Aug. 6, 2015, now abandoned.

(51) Int. Cl.
*G06F 9/46* (2006.01)
*G06F 13/00* (2006.01)
*G06F 13/28* (2006.01)
*G06F 9/50* (2006.01)
*G06F 12/0842* (2016.01)

(52) U.S. Cl.
CPC .......... *G06F 9/5016* (2013.01); *G06F 9/5027* (2013.01); *G06F 12/0842* (2013.01); *G06F 2212/1024* (2013.01); *G06F 2212/62* (2013.01)

(58) Field of Classification Search
None
See application file for complete search history.

(56) References Cited

U.S. PATENT DOCUMENTS

| | | | | |
|---|---|---|---|---|
| 6,957,431 B2 * | 10/2005 | Bollella | ................ | G06F 9/4887 718/100 |
| 2011/0239220 A1 * | 9/2011 | Gibson | ................ | G06F 1/3206 718/103 |

* cited by examiner

*Primary Examiner* — Bing Zhao
(74) *Attorney, Agent, or Firm* — Angel N. Gerdzhikov; Donna P. Suchy; Daniel M. Barbieri

(57) ABSTRACT

A system and method for ensuring a minimum required availability of a Hosted Function (HF) may retain an entirety of a cache content between separate instances of one or more HF which may share a cache resource. Based on controlling a relationship between an unavailability of cache memory desired by the HF to a probability of the available cache being unusable by the HF, each activation period may be variable within a tolerance to achieve a certification strategy. The approach may statistically characterize a best case, expected case, and worst case of cache availability. The system and method may determine a quality of the cache state at the activation of a particular HF and, based on the statistical analysis of that quality over time, determine a desired derated activation period for each HF to achieve a minimum level of computational availability for successful activation of the HF.

20 Claims, 10 Drawing Sheets

CACHE RETENTION ANALYSIS SYSTEM AND METHOD

CROSS-REFERENCE TO RELATED APPLICATIONS

The present application is a Continuation of and claims the benefit under 35 U.S.C. §120 of U.S. patent application Ser. No. 14/820,099 filed Aug. 6, 2015 entitled "Cache Retention Analysis System and Method" which is incorporated by reference in its entirety.

FIELD OF THE INVENTIVE CONCEPTS

Embodiments of the inventive concepts disclosed herein relate generally to ensuring adequate processor availability and associated cache availability is available to a hosted function to meet a minimum guaranteed activation rate of the hosted function. More particularly, embodiments of the inventive concepts disclosed herein relate to controlling a relationship between an unavailability of cache memory desired by the hosted function to a probability of the available cache being unusable by the hosted function.

BACKGROUND

Existing computing platforms may host multiple partitions to simultaneously carry out multiple tasks. Computation time of a processor may be made available to one or more Hosted Function (HF)s by activating each partition for a period of time using a predicable schedule. This may allow each HF to enjoy and expect a provisioned portion of the computation time of the processor.

Existing avionics Integrated Modular Avionics (IMA) computing platforms may also use this partitioning scheme to carry out avionics related functions. IMA computing platforms may have various processor types including a single core processor as well as a multiple core processor. As IMA computing platforms and numbers of cores advances with computational requirements, computational partitioning and available cache may increase in desirability to the corresponding increase in HF number and complexity.

In avionics, a large portion of processor time may be expended accessing memory normally via three operations (data read, data write, and instruction read). Very few avionics HFs retain algorithmic logic code and computation data in processor cache, and spend the activated processor time refining the computation on this data. Instead, most avionics HF 1) gather large amounts of data, 2) compute on the data using large portions of algorithmic code (large relative to the cache size), and 3) produce large amounts of computed data for avionics use.

The time needed for an avionics HF to access memory is a significant contributor to the computation ability available in a fixed period of time. Some processor designs may include a processor cache associated with the core processor in order to expedite a mean rate of cache memory access. The time needed to access data available in the cache memory may be significantly less than the time needed for the HF to access the physical memory.

During the activation time of a HF, the HF interacts with the cache and writes data content to the cache. During this time of HF execution a portion of the data content in the cache that will be needed for future cache accesses by that HF increases. This is due to 1) cache size capacity holding previous data access, 2) cache architecture using multiple ways, and 3) the use of spatial or temporal look-ahead policies. When a first HF is paused and additional HFs are allowed to run, the cache content begins to reflect the accesses of the additional HFs. The cache content that will be needed by the paused first HF is slowly overwritten as the additional HFs run.

Each avionics processing system may be required to be certified before being installed and used within the avionics suite of an aircraft. Rigorous testing and certification performance standards may be imposed by a certification authority before a system may become certified. A minimum performance requirement may be required of a HF before certification is awarded.

When using an IMA partitioned HF schedule, HFs may be activated and deactivated based on the schedule. In certification of an IMA partitioning strategy, one concern may include the predictability of the cache content state when a HF is activated. The amount of time needed for a HF to perform its intended function is directly influenced by the state of the cache content upon HF activation.

One concern in certification may include if the cache state were left unknown, then perhaps at activation of the first HF, the cache state may or may not be sufficient to allow the first HF to complete its intended operation.

One traditional method of mitigating an unknown cache state when activating a HF may include a system designed to invalidate or 'flush' all of the cache prior to the first HF activation. This may ensure that all accesses that occur during the activation period of the HF will be influenced only by the sequence of accesses made following the time of activation. Therefore, the computation performance is deemed deterministic in the sense that it is known similar results will be found in operation as well as during a controlled certification. This traditional strategy may provide a straightforward certification method—as the cache state is known, each time the first HF is activated, the first HF may always find a guaranteed amount of available cache to properly operate.

Another traditional method of cache management may include a cast out policy applied to the cache. A traditional cast out policy may choose what contents of cache are removed at the deactivation point of a HF and replaced with new data stored in the cache. Because computational capacity is strongly dependent on the rate at which a processor may be able to read the cache, the cast out policy may directly affect the state of the cache therefore directly impacting the HF success at activation.

The problems with these traditional methods may include 1) the time to perform cache invalidation or operate a cast out policy may be large (this is often not considered, but the invalidation time can be long and variable in duration), 2) time to perform a cache invalidation may can be unpredictable as it is dependent on the cache state residue from previous activated HFs, 3) scalability—time for a invalidation and cast out of a large cache may be large enough to affect the activation scheduling policy, and 4) only some or no relevant content remains—cache state is fully cleared (this makes the activated HF less efficient than it would be if some valid cache remained).

Therefore, as traditional methods are unpredictable, take time and processor power, and ultimately make each HF less efficient, a need remains for method and system capable of cache retention to enable a desired HF quick access to desirable cache for immediate HF activation and operation.

SUMMARY

In one aspect, embodiments of the inventive concepts disclosed herein are directed to a system for ensuring a minimum required availability of a hosted function. The system may comprise a core processor configured for executing a first hosted function and a second hosted function, a random access memory associated with the core processor and operably coupled with the processor, a cache memory associated with the core processor and operably coupled with the processor, the core processor coupled with a display device configured for displaying a product of the first hosted function and the second hosted function.

The system may include a performance monitor associated with the core processor, the performance monitor comprising non-transitory computer readable program code for ensuring a minimum required availability of the first hosted function and the second hosted function, the non-transitory computer readable program code comprising instructions which, when executed by the core processor, cause the core processor to perform and direct the steps of receiving a first minimum availability requirement for the first hosted function.

The system may also receive a second minimum availability requirement for the second hosted function, activating a first instance of the first hosted function, the first instance of the first hosted function activated for a first period and in compliance with the first minimum availability requirement, the first instance writing a first data content to the cache memory and reading the first data content from the cache memory.

The system may further activate a first instance of the second hosted function, each first instance of the second hosted function in compliance with the second minimum availability requirement and writing an additional data content to the cache memory and reading the additional data content from the cache memory, deactivating each of the first instance of the first hosted function and the first instance of the second hosted function, retaining the first data content and the additional data content within the cache memory, activating a subsequent instance of the first hosted function and the at least one second hosted function for an individual variable second period, measuring each subsequent instance to determine a compliance with the first minimum availability requirement and the second minimum availability requirement, the measuring including at least a measurement of a reading of one of the first data content and the second data content, and a measurement of a computation rate for each subsequent instance of the first hosted function and the second hosted function.

The system may also determine a derated individual variable period for each of the first hosted function and the second hosted function to meet each of the first minimum availability requirement and the second minimum availability requirement, the derated individual variable period longer than the first period. The system may activate each of the first hosted function and the second hosted function for the derated individual variable period, the activating at least meeting each of the first minimum availability requirement and the second minimum availability requirement. The system may finally display to an operator on the display, the product of the first hosted function and the second hosted function.

In a further aspect, embodiments of the inventive concepts disclosed herein are directed to a system wherein the core processor further comprises a single core processor and a multiple core processor, the multiple core processor may include two or more or at least four core processors sharing a common level two cache memory.

In a further aspect, embodiments of the inventive concepts disclosed herein are directed to a system wherein the measuring further includes an unavailability per hour, a probability of failure at each activation, a standard deviation, a cache hit rate margin, and a computed activation time margin.

In a further aspect, embodiments of the inventive concepts disclosed herein are directed to a system wherein activating a subsequent instance of the first hosted function and the second hosted function further comprises activating each hosted function in compliance with a partition schedule.

In a further aspect, embodiments of the inventive concepts disclosed herein are directed to a system wherein reading the first data content and the additional data content further comprises reading a level two cache of each of the first data content and the additional data content.

In a further aspect, embodiments of the inventive concepts disclosed herein are directed to a system wherein the random access memory is a double data rate random access memory and also wherein the derated individual variable period is sufficient for operation of the hosted function within compliance with a design assurance level.

In a further aspect, embodiments of the inventive concepts disclosed herein are directed to a system wherein retaining the first data content and the additional data content within the cache memory further includes retaining all of the level one cache and all of the level two cache.

In a further aspect, embodiments of the inventive concepts disclosed herein are directed to a system wherein the performance monitor operates to determine the derated individual variable period for each of the first hosted function and the second hosted function before operation of an aircraft onboard which the system is deployed, and also during airborne operation of the aircraft onboard which the system is deployed.

In a further aspect, embodiments of the inventive concepts disclosed herein are directed to a system wherein activating a subsequent instance of the first hosted function and the second hosted function further comprises activation on a schedule based on a system performance requirement.

In a further aspect, embodiments of the inventive concepts disclosed herein are directed to a method for ensuring a minimum required availability of a hosted function. The method may comprise receiving a first minimum availability requirement for a first hosted function, the receiving within core processor configured for executing the first hosted function and second hosted function, and receiving a second minimum availability requirement for the second hosted function. The method may store each of the first minimum availability requirement and the second minimum availability requirement within a random access memory associated with the core processor and operably coupled with the processor.

The method may activate a first instance of the first hosted function, the first instance of the first hosted function activated for a first period and in compliance with the first minimum availability requirement, the first instance writing a first data content to a cache memory associated with the core processor and operably coupled with the processor and reading the first data content from the cache memory. The method may also activate a first instance of the second hosted function, each first instance of the second hosted function in compliance with the second minimum availability requirement and writing an additional data content to the cache memory and reading the additional data content from the cache memory. The method may deactivate each of the first instance of the first hosted function and the first instance of the second hosted function and retain the first data content and the additional data content within the cache memory.

The method may also activate a subsequent instance of the first hosted function and the second hosted function for an individual variable second period, and measure each subsequent instance via a performance monitor associated with the core processor to determine a compliance with the first minimum availability requirement and the second minimum availability requirement, the measuring including at least a measurement of a reading of one of the first data content and the second data content, and a measurement of a computation rate for each subsequent instance of the first hosted function and the second hosted function.

The method may further determine a derated individual variable period for each of the first hosted function and the second hosted function to meet each of the first minimum availability requirement and the second minimum availability requirement, the derated individual variable period longer than the first period. The method my activate each of the first hosted function and the second hosted function for the derated individual variable period, the activating at least meeting each of the first minimum availability requirement and the second minimum availability requirement and display to an operator on a display device operably coupled with the core processor, a product of the first hosted function and the second hosted function.

It is to be understood that both the foregoing general description and the following detailed description are exemplary and explanatory only and are not necessarily restrictive of the inventive concepts disclosed herein as claimed. The accompanying drawings, which are incorporated in and constitute a part of the specification, illustrate embodiments of the inventive concepts disclosed herein and together with the general description, serve to explain the principles of the inventive concepts.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the presently preferred embodiments of the inventive concepts disclosed herein, examples of which are illustrated in the accompanying drawings.

The following description presents certain exemplary embodiments of the inventive concepts disclosed herein. However, the inventive concepts disclosed herein may be embodied in a multitude of different ways as defined and covered by the claims. In this description, reference is made to the drawings wherein like parts are designated with like numerals throughout.

Overview

Embodiments of the inventive concepts disclosed herein are directed to a system and method for cache retention between separate instances of one or more Hosted Function (HF) which may share a cache resource. Based on controlling a relationship between an unavailability of cache memory desired by the hosted function to a probability of the available cache being unusable by the hosted function, each activation period may be variable within a tolerance to achieve a certification strategy. A three tiered approach may statistically characterize a best case, an expected case, and a worst case of cache availability to the desired HF. The system and method may determine a quality of the cache state at the activation of a particular HF and, based on the statistical analysis of that quality over time, determine a desired derated activation period for each HF to achieve a minimum level of computational availability for successful activation of the HF.

Embodiments of the inventive concepts disclosed herein may 1) provide each of the HFs at least a minimum amount of computational capacity at each activation of each HF and 2) provide the minimum amount of computation capacity over intervals of time. For example, in an avionics architecture, a plurality of HFs operating on a processing system may be constructed from a scheduled partitioning of the processing resources within the processing system. Each of the hosted functions may be activated for an exemplary one millisecond (ms) for a first HF, 10 ms for a second HF, and seven ms for a third HF. An exemplary average activation duration may be within a range of one to 20 ms. In this realm of timing, a certification strategy capable of performance over 1 second may be insufficient since each HF may activate and deactivate a number of times over the one second duration. Embodiments of the inventive concepts disclosed herein may operate to ensure a successful certification strategy capable of successful accurate activation probability each ms.

Figure 1:
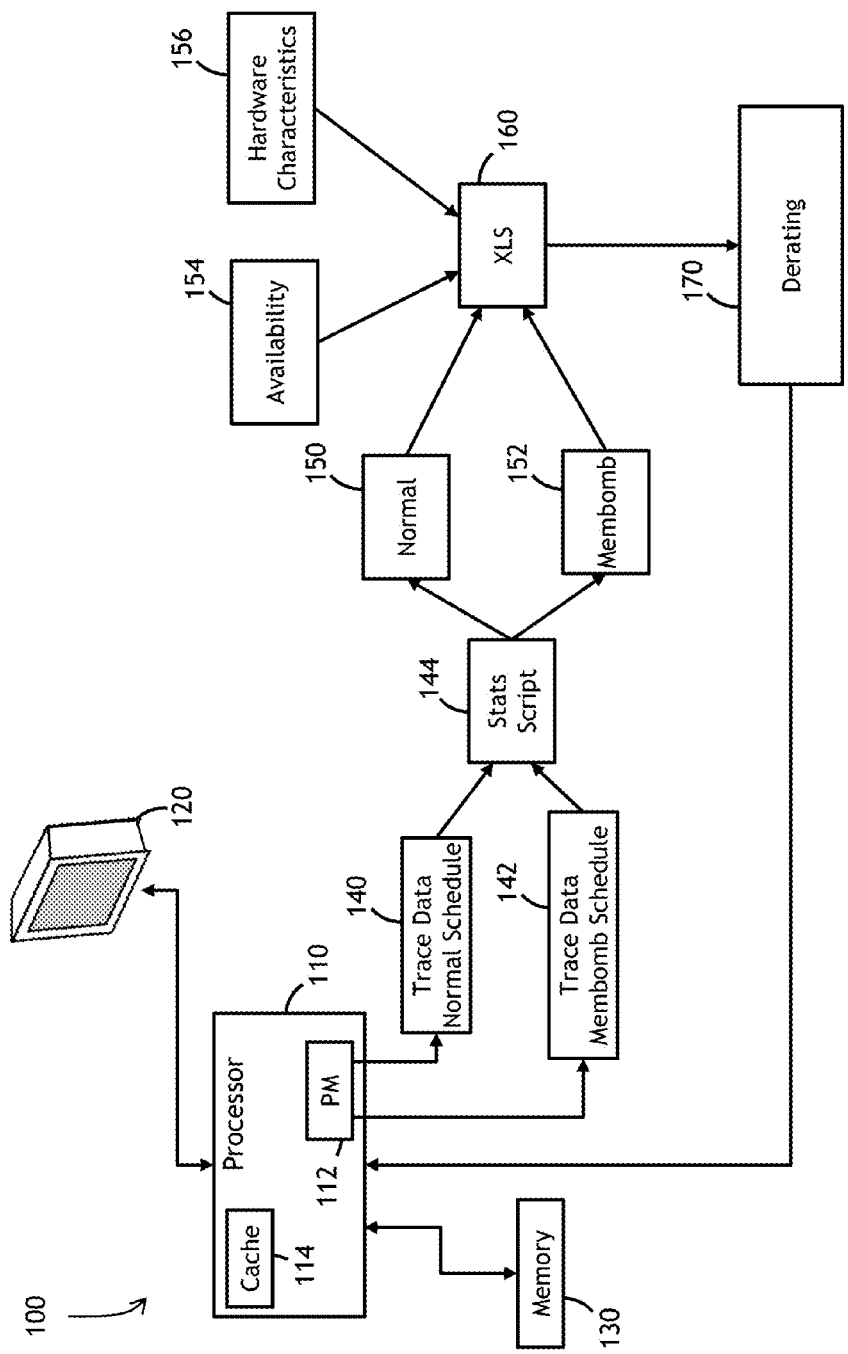
FIG. 1 is a diagram of an exemplary system for cache retention in accordance with an embodiment of the inventive concepts disclosed herein.

Referring to FIG. 1, a diagram of an exemplary system for cache retention in accordance with an embodiment of the inventive concepts disclosed herein is shown. A system 100 for cache analysis and retention may include a processor 110 configured with a cache memory 114 and a performance monitor 112. A display device 120 associated with the processor 110 may display a product of a Hosted Function (HF) activated by the processor 110. A memory 130 external to the processor may store non-transitory computer readable program code for causing the processor to perform each HF.

The performance monitor 112 may include recording trace data in accordance with a normal schedule 140 as well as trace data according to a membomb schedule 142. For example, trace data may exemplary be collected at a plurality of phases throughout the activation period of the first HF. In embodiments, the system 100 may collect trace data for an exemplary 10 μs period or "bin" of time. Preferably, a fixed interval may be useful for embodiments of the inventive concepts disclosed herein to perform the cache analysis and determine an appropriate derated activation period for the HF. Additional exemplary fixed bins may include 12 μs or 15 μs. In addition, a variable interval may be appropriate for accurate cache analysis in certain circumstances. Such variable periods may include a bin of 13 μs, 9 μs and 8 μs.

As the collected trace data may be relatively large, the performance monitor 112 may operate to analyze the trace data collected under the normal schedule 140 and the membomb schedule 142 within a statistics module 144 to produce a usable normal dataset 150 as well as a usable membomb dataset 152. A combined data 160 may be a collection point for each usable normal dataset 150 and the usable membomb dataset 152, an availability input 154, and a hardware characteristics input 156.

As used herein, a normal schedule of operations may be defined as a baseline operation of the processor 110 where each activation of a HF may write and read data to/from the cache memory 114. Each activation of each HF may write its own set of data to the cache memory 114 and normally use less than the full amount of cache memory. Conversely, a memory bomb (membomb) HF may be defined as a HF activation which uses a substantial amount (e.g., all) of cache memory 114 assets and causes the cache content to be irrelevant to future activation of a different HF. The membomb HF active in the membomb schedule may operate to use the entirety of the cache memory 114 for its purposes during its activation.

The system 100 may further include a derating module 170 configured to receive input from the combined data 160 and provide a derated percentage to the processor 110 to apply to an instance of a HF. As used herein, a derated percentage may be defined as a lengthening of an activation time of a HF to achieve a minimum activation level required by the certification strategy. For example, a first HF may operate on a schedule of 10 ms of activation in an environment with the best case cache scenario to achieve a desired level of function. Whereas in a worst case scenario of cache availability to the first HF, a longer activation time of 10.07 ms (a 7% derate) may assure that the HF operates to the same level of function.

The performance monitor 112 may ensure analytically that a computational availability of the processor 110 to each instance of a HF is not reduced. The system 100 may ensure a sufficient computational platform availability since a denial of sufficient computational capacity may be equivalent to the computation platform failure to support the HF (e.g., physical failure). The system 100 may capitalize on a difference between a cache state based denial of computation capacity versus a processor failure based denial. Since the cache based denial of computation capacity is transient, the system 100 may operate to ensure adequate computational capacity is available to each instance of each HF operating on the processor 110.

The system 100 may operate to retain the content of the cache memory 114 between a first instance of the HF and a subsequent instance of the HF by not invalidating the cache between partition transitions. This cache retention may ensure the functional availability probability of the processor 110 to each individual activation of each HF is not significantly reduced. The system 100 strategy may have several advantages over traditional models: 1) zero time to perform (no action, unlike the invalidation strategy that requires a variable amount of time.), and 2) improved HF computation when needed cache content is not invalidated as relevant cache content is not removed.

One challenge the system 100 cache retention strategy may overcome includes the cache state being affected by each activated HF. As a first HF is deactivated on a schedule, a second HF may be activated and write its own data content to the cache 114. Once a subsequent instance of the first HF is activated, the cache 114 state may be different than it was at the point of deactivation of the first instance. Therefore, the certification strategy justifying the system 100 availability may be more detailed.

System 100 may employ the performance monitor 112 to ensure adequate performance of each instance of each HF in compliance with the performance requirements of the certification strategy. The system 100 may operate to ensure 1) each HF is provided at least a known quantity of processor 110 capacity at each activation at a certain probability, and 2) the known quantity of processor capacity applies to all activation instances and times (e.g., 1, 2, 20 milliseconds (ms)). This enables each HF to perform its intended function and may be established during a foot-printing process. In the context of avionics, the system 100 certification strategy may reflect the actual configuration of the deployed system. In this case, the duration of HF activation time including durations of one ms.

In embodiments, the system 100 may operate in compliance with one minimum availability requirement including a probability per hour (under provisioning processor capacity) of successful function of the first HF. An under provisioning (due to cache state) may imply loss of the instance of the HF where correctness of HF computation is not affected. Under-provisioning may be transient wherein the next instance of the HF activates again after short "repair" time. Repair time may be defined as a time from HF deactivation due to an invalid intended function to when the activated HF supports the intended function.

For example, a next activation (one activation period~50 ms) and reset that HF only (repair time is HF reset time~0.5 second). Here, an unavailability rate of $10^{-4}$ per hour is realized per HF instance. Should the system 100 command two instances of the HF, the system level unavailability may become $10^{-8}$ per hour.

Embodiments of the system 100 may operate in accordance with a specific Design Assurance Level (DAL). Such a DAL may mandate a certain level of performance over time of activation of the HF. For example, a first DAL may determine an assurance level for a HF requiring a high level of criticality (e.g., an autopilot or a horizon display) while a second DAL may apply to a lesser critical HF such as a maintenance operation or system status message.

In embodiments, the system 100 may operate on each level of cache within the cache memory 114. A first level of cache memory 114 (L1) may replenish very quickly compared to a second level of cache memory 114 (L2). L1 cache may be analyzed on an aggregate basis and falls directly within the scope of embodiments disclosed herein. However, while an analysis of the L1 cache may also directly apply, this disclosure may present a particular focus on the second level of cache (L2 cache).

Each of the usable normal dataset 150 and the usable membomb dataset 152 may comprise a mean cache hit rate, a standard deviation, and an access distribution for each HF at an exemplary 1 ms resolution. In this manner, the required parameters for cache analysis may be aggregately extracted from the trace data.

Hardware characteristics 156 may provide a multiplier on processor cache access time specification necessary to account for a variety of processor architectures. Cache availability 154 may provide an input associated with availability of the cache memory 114 to the HF as influenced by other HF operating on the same core processor 110. A cache hit rate per HF approaches steady state as activation time increases, and is lowered by additional HF operating on the same core processor 110.

In embodiments, the cache availability 154 may provide a first activation period (footprint) for the first HF under the best case scenario of cache availability. In this case the HF is capable of meeting its intended function. In one embodiment, the memory 120 may include a Double Data Rate random access memory (DDR) configured for access types of 1) Instruction Fetch, 2) Data Read, and 3) Data Store. For example:

$$W=[W_{i=0=instruction}, W_{i=1=data\ read}, W_{i=2=data\ store}]$$

A time required to access the DDR memory 120 may be exemplary states as:

$$t_{DdrAccess_i}$$

is the duration of time to perform a DDR memory access of type i. This is based on a guaranteed bandwidth values computed for DDR memory access rate capabilities.

The cache availability 154 may also provide an effective cache access time modified for the single processor 110 access to the cache 114.

With these inputs, the deration module 170 may determine a cache analysis deration percentage (increased activation period) applicable to the first HF to ensure the instance of the first HF is capable of providing the performance equal to that found in the first activation period.

Figure 2:
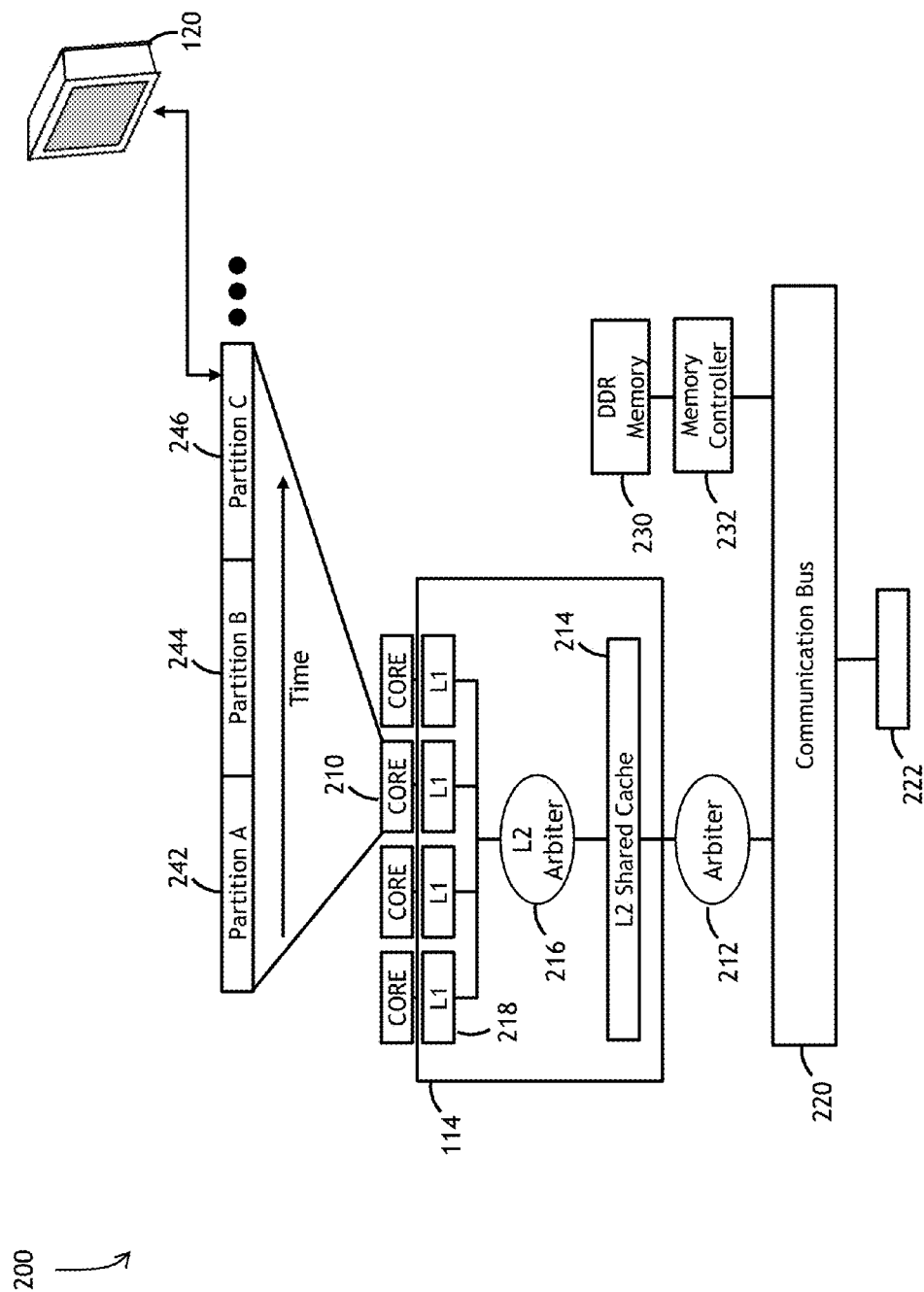
FIG. 2 is a diagram of an exemplary multicore processor architecture in accordance with an embodiment of the inventive concepts disclosed herein.

Referring to FIG. 2, a diagram of an exemplary multicore processor architecture in accordance with an embodiment of the inventive concepts disclosed herein is shown. A multicore processor system 200 may function to provide exemplary display data to an operator of an aircraft. Embodiments of the inventive concepts disclosed herein may operate within a plurality of architecture types. A core processor 210 of the multicore processor system 200 may operate to provide the processing function to each HF. Each core processor 210 may be configured with its own level one L1 cache 218 and share a L2 cache memory 214 via an L2 arbiter 216 with other core processors within the multicore processor system 200.

A communication bus 220 may operate to connect the cache memory 114 to the entirety of the system via an arbiter 212. In addition, the corenet may operatively connect a memory controller 232, a DDR memory 230, and peripheral connection points 222 to the entirety of the multicore processor system 200.

For example, one or more core processors 210 may be configured to share a single cache memory 214. In this case, additional HF may operate to write their own data content to the shared cache memory 214.

The L2 arbiter 216 may also provide an effective cache access time modified for inter-core competition for the shared L2 cache. For example, a cache access may be defined as $t_{cacheAccess_i}$ the duration of time to perform a cache access of type i. This cache access may be based on processor specification descriptions.

The multicore processor system 200 may operate to increase time required to inspect the shared cache memory 214 for data content increases as other cores may access the shared cache (cache shared banks).

Figure 3:
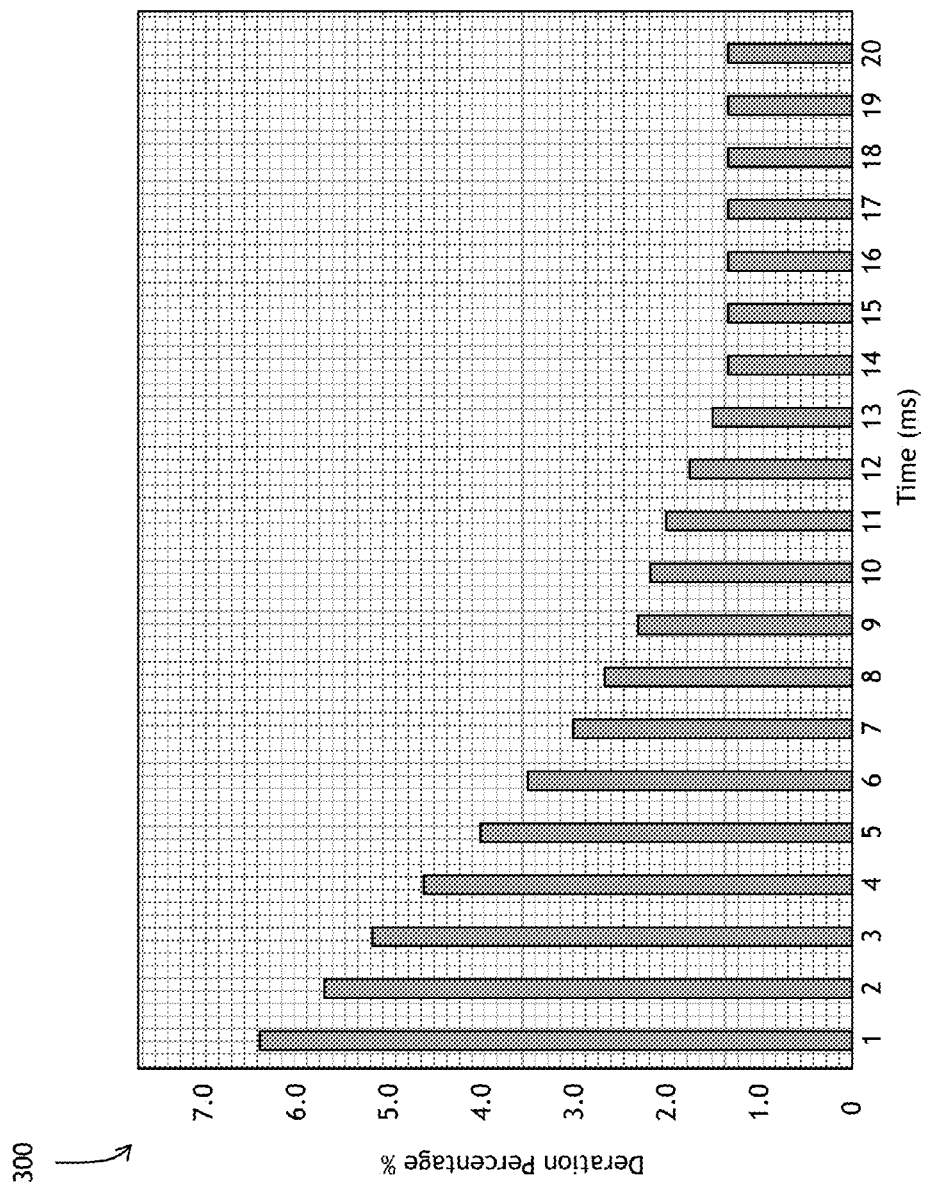
FIG. 3 is a diagram of an exemplary deration percentage of a hosted function in accordance with an embodiment of the inventive concepts disclosed herein.

Referring to FIG. 3, a diagram of an exemplary deration percentage of a hosted function in accordance with an embodiment of the inventive concepts disclosed herein is shown. A deration percentage 300 may indicate the quality of the cache state as an individual HF may be activated a number of instances over time. Here, with 20 instances of the same HF, a first instance of the HF may be activated for an activation period 6.4% longer than the footprint activation to achieve the same function while the 10$^{th}$ activation may only be required to be derated by 2.2% to achieve the same results.

For example, the first HF may maintain a footprint of 10 ms. The system 100 and system 200 may command a subsequent activation according to the deration of 6.4% of 106.4 ms to achieve the same function results to comply with the minimum activation requirement of the certification strategy.

Figure 4:
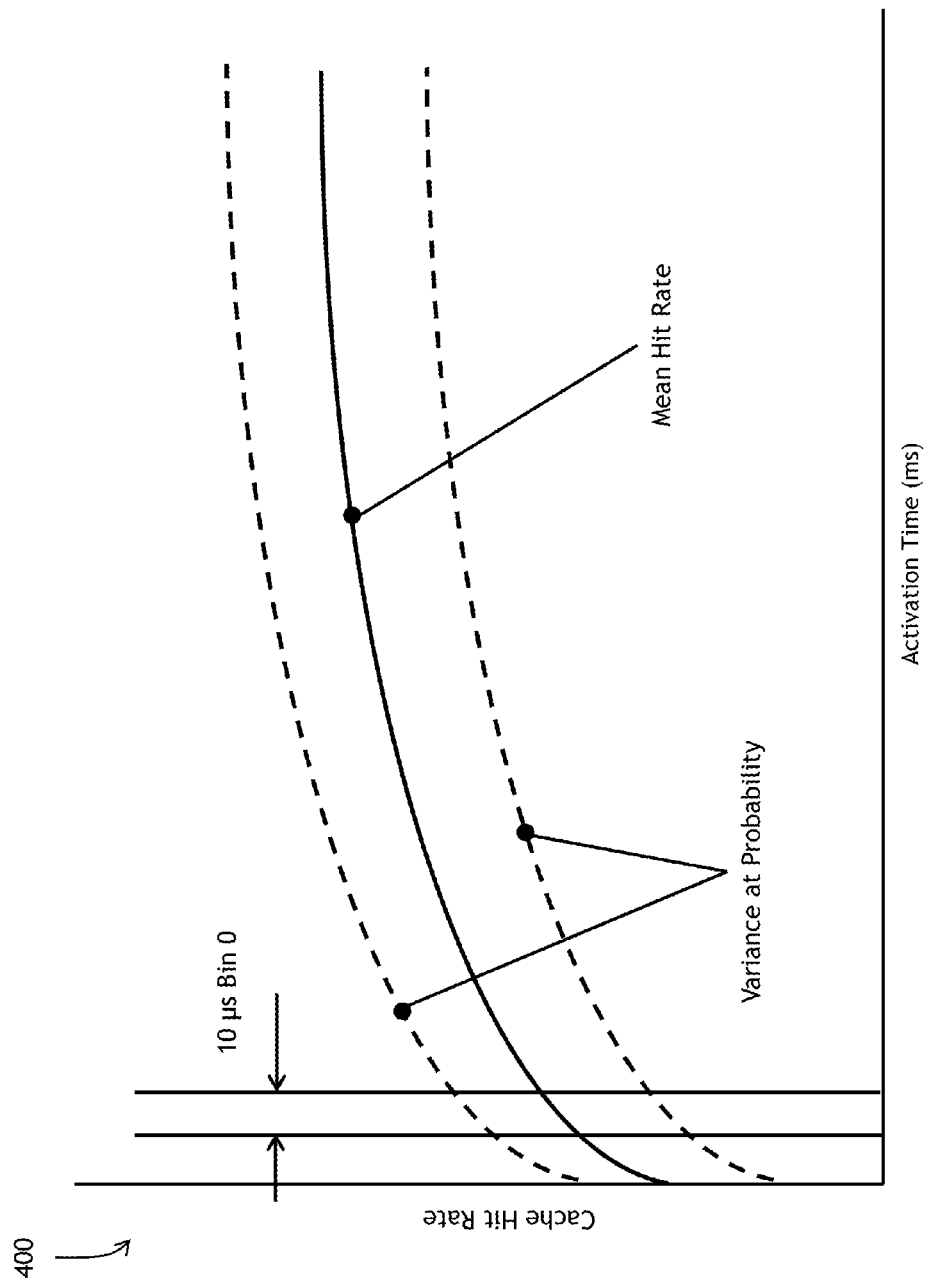
FIG. 4 is a graph of a cache hit rate over activation time exemplary of an embodiment of the inventive concepts disclosed herein.

Referring to FIG. 4, a graph of a cache hit rate over activation time exemplary of an embodiment of the inventive concepts disclosed herein is shown. A cache hit rate mean and variance graph 400 may indicate an increase in cache hit rate as activation time progresses.

In embodiments, each cache access may have a probability of a cache hit and a probability of a cache miss. As used herein, a cache hit may be defined as a HF access to the cache memory 114 wherein the HF is able to retrieve usable data from the cache memory 114. Also, a cache miss may be defined as the opposite, a HF access of the cache memory 114 where the HF is unable to retrieve data from the cache memory directly applicable to the operation of the HF. The cache hit rate mean and variance graph 400 may indicate a cache mean hit rate as measured from a cache access rate compared with a cache hit rate.

$P_{miss_i}$ may be defined as the probability of a cache miss upon a memory access attempt of type i and $t_{activation}$ is the duration of time an application is activated in a partition schedule. For example a partition may be activated for 10 ms each 100 ms, so that $t_{activation}$ is 10 ms. $W_i$ is the number of DDR memory cache line access attempts of type i.

The system 100 and system 200 may determine a ratio of memory access via $t_{memAccess}(W, P_{miss})$ is the total duration of time needed to perform the W accesses given miss rate probabilities $P_{miss}$.

$$t_{memAccess}(W, P_{miss}) = \Sigma_{i\ in\ DDR\ Types}\ W_i(t_{cacheAccess_i} + P_{miss_i} \cdot t_{DdrAccess_i})$$

$R_{memAccess}(W, P_{miss})$ is the portion of time spent accessing memory.

$$R_{memAccess}(W, P_{miss}) = \frac{t_{memAccess}(W, P_{miss})}{t_{activation}}$$

The system 100 and system 200 may further compute probabilities of good and bad misses of the cache access via $P_{missGood}$ and $P_{missBad}$ are determined using the inverse normal. Each are selected so that they represent a deviation from the mean cache hit rate of the normal distributions of each 10 us bin.

$t_{memAccess_{Good}}$ is the total duration of time needed to perform the W accesses given miss rate probabilities $P_{missGood}$.

$$t_{memAccess_{Good}} = t_{memAccess}(W, P_{missGood})$$

$t_{memAccessBad}$ is the total duration of time needed to perform the W accesses given miss rate probabilities $P_{missBad}$.

$$t_{memAccess_{Bad}} = t_{memAccess}(W, P_{missBad})$$

$T_{est_{j=Good\ or\ Bad}}$ is the total estimated time needed to run the hosted function assuming either probability $P_{missGood}$ or $P_{missBad}$.

$$T_{est_{j=Good\ or\ Bad}} = t_{activation} \cdot \left[ (1-r) + r \cdot \frac{t_{memAccess}(W, P_{miss\ j=Good\ or\ Bad})}{t_{memAccess}(W, P_{miss})} \right],$$

where $r = R_{memAccess}(W, P_{miss})$.

Where t=activation time (e.g., 10 ms) and (1−r) is the ratio of time not spent accessing memory. This portion of time is not affected by the cache as memory is not being accessed; and $$r \cdot \frac{t_{memAccess}(W, P_{miss\ j=Good\ or\ Bad})}{t_{memAccess}(W, P_{miss})}$$

is the ratio of time spent accessing memory multiplied by the ratio of $t_{MemAccess}$ (assuming $P_{missBad}$)/$t_{memAccess}$ original. Recall FIG. 2 shows the elongated activation time needed to achieve the same computation. Where margin is amount of increase in activation time needed to insure the computational capacity is provided to the hosted function at the probability intended.

$$\text{margin} = 1 - \frac{T_{est_{Good}}}{T_{est_{Bad}}}$$

The cache hit rate generally improves as the HF executes during its activation time. Each HF has its own steady state based on behavior. HF steady state may be influenced by intrinsic cache access variation of the HF and algorithmic dynamics of the individual HF.

An amount of cache state variation from the steady state (at some probability) relates to the unavailability of the HF. When an HF has been activated for a sufficient period of time, cache content is largely a result of that same HF.

In embodiments, the system 100 and system 200 may determine a statistical variation in cache hit rate for the $i^{th}$ 10 μs bin. For each 10 μs bin the system 100 and system 200 may record the cache access count and cache hit count. This provides a cache hit value to be determined for each exemplary 10 μs of activation of the HF. From this accumulated set of data the system 100 and system 200 may determine the mean and variance. The system 100 and system 200 may determine two sources of statistical variation in the data.

A first source may include 1) a variation in the algorithmic progression of the software itself. Some HF are written in such a way so that they will exactly repeat the sequence of execution code each time the HF is activated. In such a case, the 3rd 10 μs bin (20 μs to 30 μs range of time) would correspond to exactly the same code execution each time the HF is activated. Other HFs my follow a different logical path in the algorithm progression each time they are activated. Most HFs fall somewhere in the middle.

A second source may include 2) a behavior of processor random cast out policy. As prior HFs operate and as the HF of interest operates up to the $i^{th}$ 10 μs bin, the randomness of the cache retention after HF activation may mean that the cache transient quality state is different. This is normal, and to be expected.

As the system 100 and system 200 may compute the statistical normal distribution for the $i^{th}$ 10 μs bin, the variance may include a combination of results of both sources 1 and 2.

Figure 5:
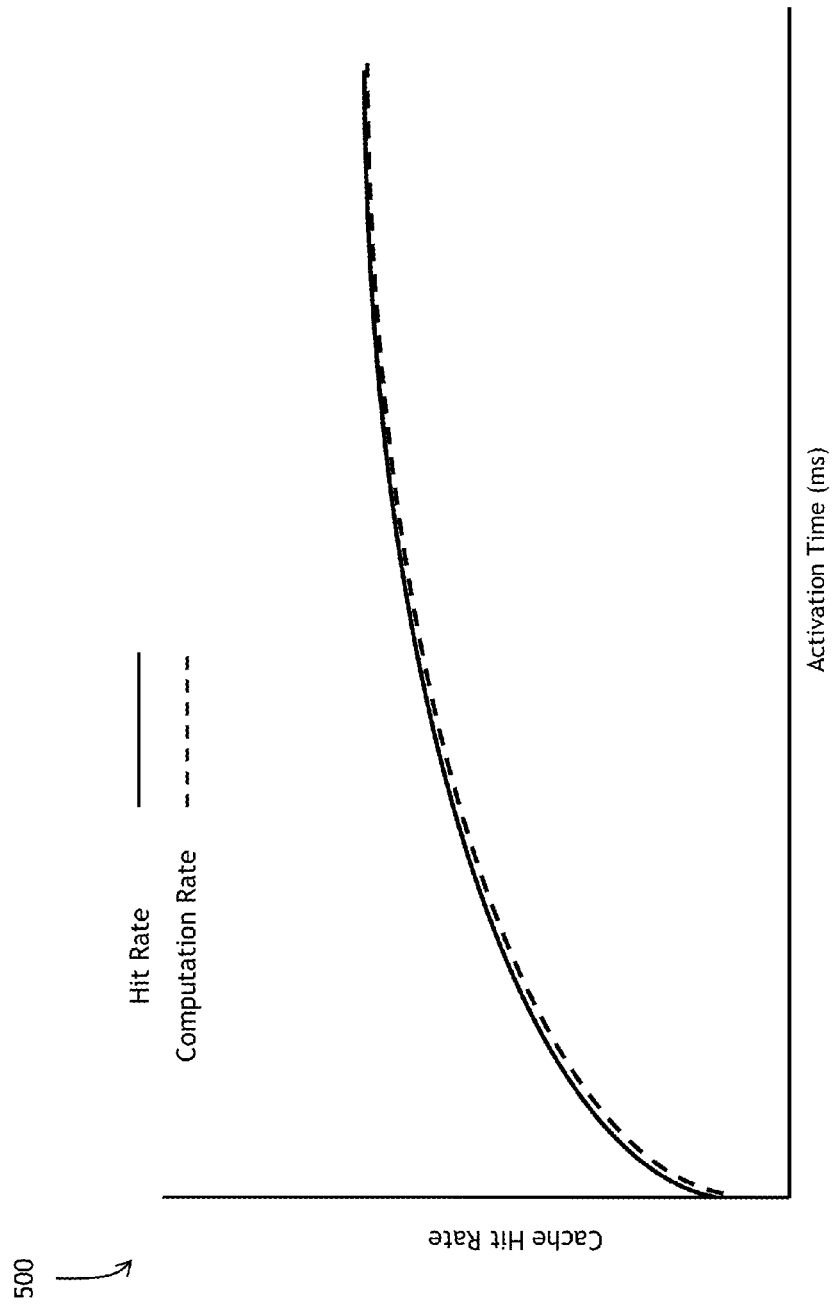
FIG. 5 is an graph of cache hit rate and computation rate over activation time exemplary of one embodiment of the inventive concepts disclosed herein.

Referring to FIG. 5, a graph of cache hit rate and computation rate over activation time exemplary of one embodiment of the inventive concepts disclosed herein is shown. A computation rate and cache hit rate graph 500 of a single HF activation may indicate a similarity between cache hit rate and computation rate.

Computation of most algorithms associated with each HF may require millions of memory accesses. Here, the system 100 and system 200 may focus on L2 cache operation including instruction fetches, data loads and data stores. As cache hit rate decreases, computation rate decreases. As cache hit rate increases—computation rate increases. Thus, the computation rate is correlated to cache access time+ (miss rate×memory access time).

The transient quality of a cache state may describe the degree to which the cache contents relate to future cache line access activities by a specific HF. For example, the better the transient quality, the higher the cache hit rate at the specific HF activation and the faster the HF may begin productive operation.

As the system 100 and system 200 may retain the state of the cache, the cache transient quality may be a function of memory accesses by prior HF, and actual cache performance may vary. Possible transient quality states may include a best case: e.g., cache state is as it was left when last activated, a normal (expected) case: e.g., based on normal HF operation, and a worst case: cache state is contents are not useful to the activated HF. The system 100 and system 200 may determine statistical characterization of these cases based on L2 cache data gathered from actual HFs.

Figure 6:
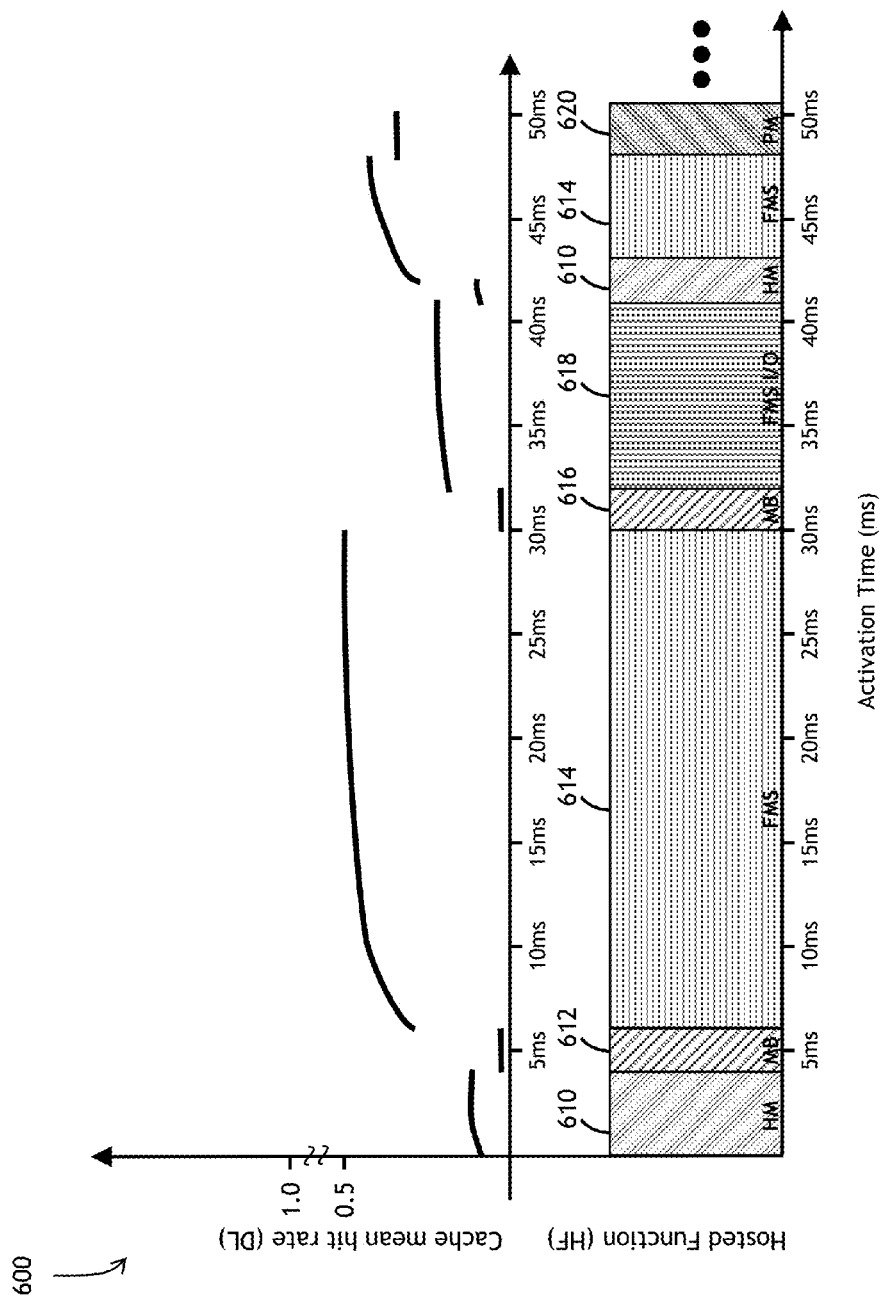
FIG. 6 is a graph of an activation schedule and associated cache mean hit rate in accordance with one embodiment of the inventive concepts disclosed herein.

Referring to FIG. 6, a graph of an activation schedule and associated cache mean hit rate in accordance with one embodiment of the inventive concepts disclosed herein is shown. An activation schedule 600 may indicate a cache hit rate per each activation of each HF. The system 100 and system 200 may activate an exemplary health monitor 610 followed by a memory bomb HF 612. As noted above, the activation of the memory bomb HF 612 may operate to reduce the cache state to invalidity for the other following HFs.

A flight management system HF 614 may activate followed by another memory bomb HF 616 activation. The system 100 and system 200 may activate an input output HF 618 as well as a subsequent instance of the health monitor 610 and the flight management 614. A performance monitor 610 may also be activated in the sequence of this exemplary partition.

Each cache hit rate may be indicated as reaching a steady state as the activation time of each HF progresses. Of note is the steeper slope of the HFs activated just after each membomb HF 612.

Figure 7:
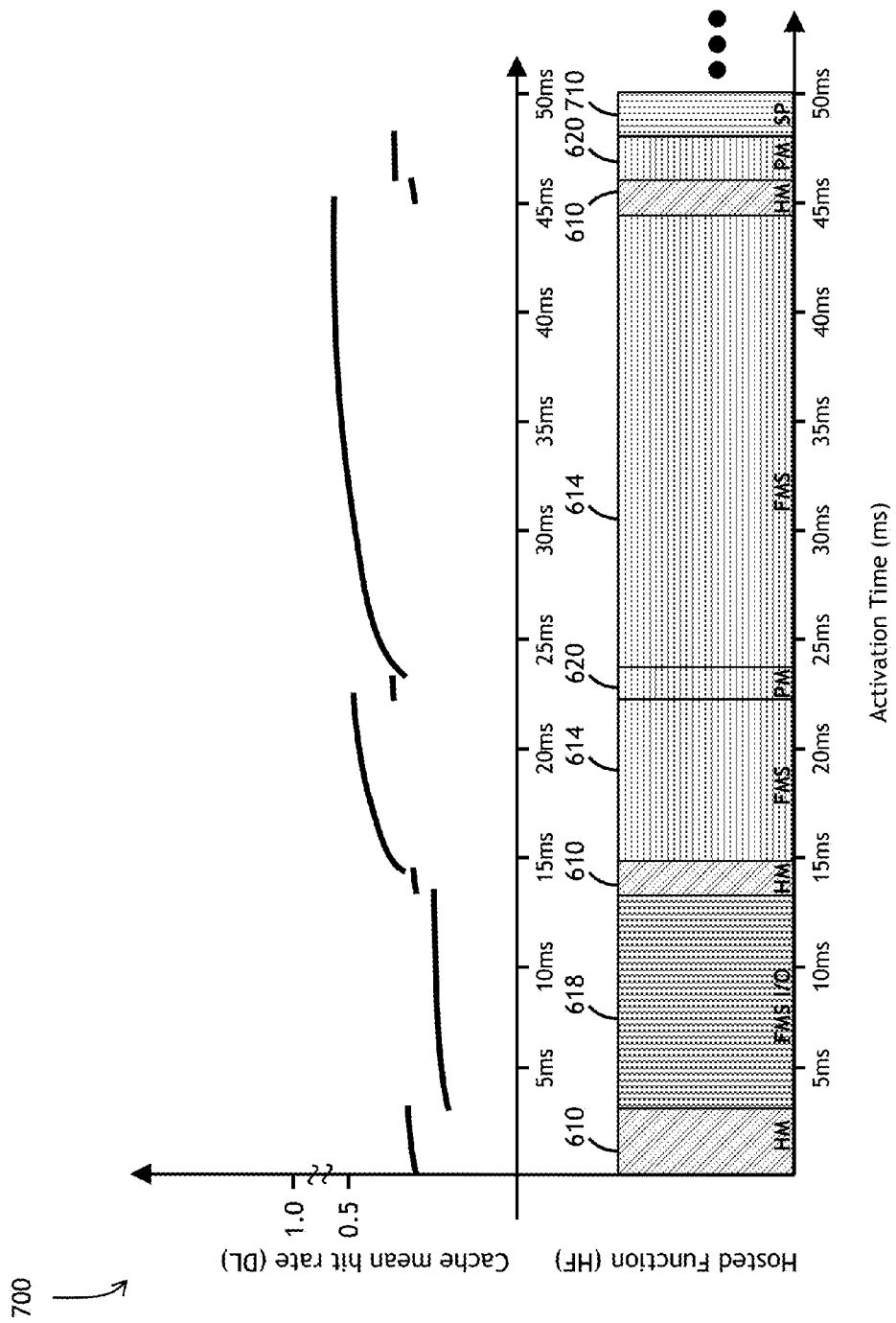
FIG. 7 is a graph of an activation schedule and associated cache mean hit rate in accordance with one embodiment of the inventive concepts disclosed herein.

Referring to FIG. 7, a graph of an activation schedule and associated cache mean hit rate in accordance with one embodiment of the inventive concepts disclosed herein is shown. A non mem bomb case 700 may include each of the HF from the previous graph. However, of note is the higher overall cache hit rate for each of the HF, especially the HFs of shorter duration. The system 100 and system 200 may add a spare time slot partition 710 operating to remain available for any of the HF requiring additional processor time.

Figure 8:
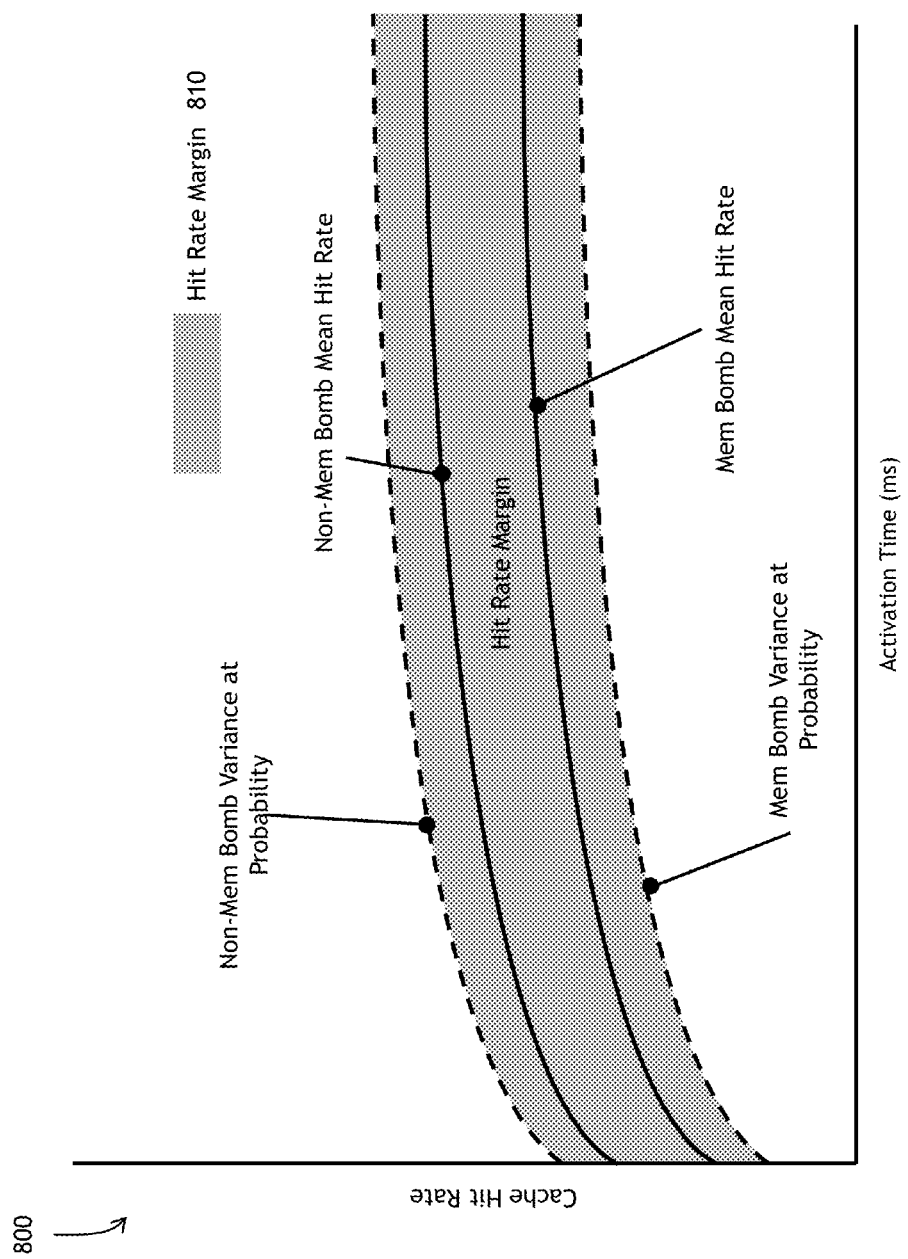
FIG. 8 a graph of a cache hit rate mean and variance over activation time in accordance with one embodiment of the inventive concepts disclosed herein.

Referring to FIG. 8, a graph of a cache hit rate mean and variance over activation time in accordance with one embodiment of the inventive concepts disclosed herein is shown. Graph 800 may indicate the system 100 and system 200 may achieve a steady state hit rate margin 810 as activation time increases.

The steady state hit rate margin 810 may indicate the margin outside the mean hit rate between the non-membomb variance at probability and the membomb variance at probability.

Where margin may be defined as an amount of increase in activation time needed to ensure the computational capacity is provided to the at the probability intended.

$$\text{margin} = 1 - \frac{T_{est_{Good}}}{T_{est_{Bad}}}$$

For example, when test good is 9 ms and test bad is 10 ms, then margin would be 1-0.9=0.1=10%. Therefore, if the HF were configured to be activated any less than 10% longer than that established in the footprint, the HF would be deprived adequate computational capacity at the probability of the unavailability of the platform.

The system 100 and system 200 may compute a total margin by aggregating the three 1 ms periods.

$$\text{margin} = \frac{1 \text{ ms}}{\text{Partition Activation time}} \cdot \sum_{k=1 \text{ ms interval}}^{3rd \text{ 1 ms interval}} \text{margin}_{kth \text{ 1 ms interval}}$$

Figure 9:
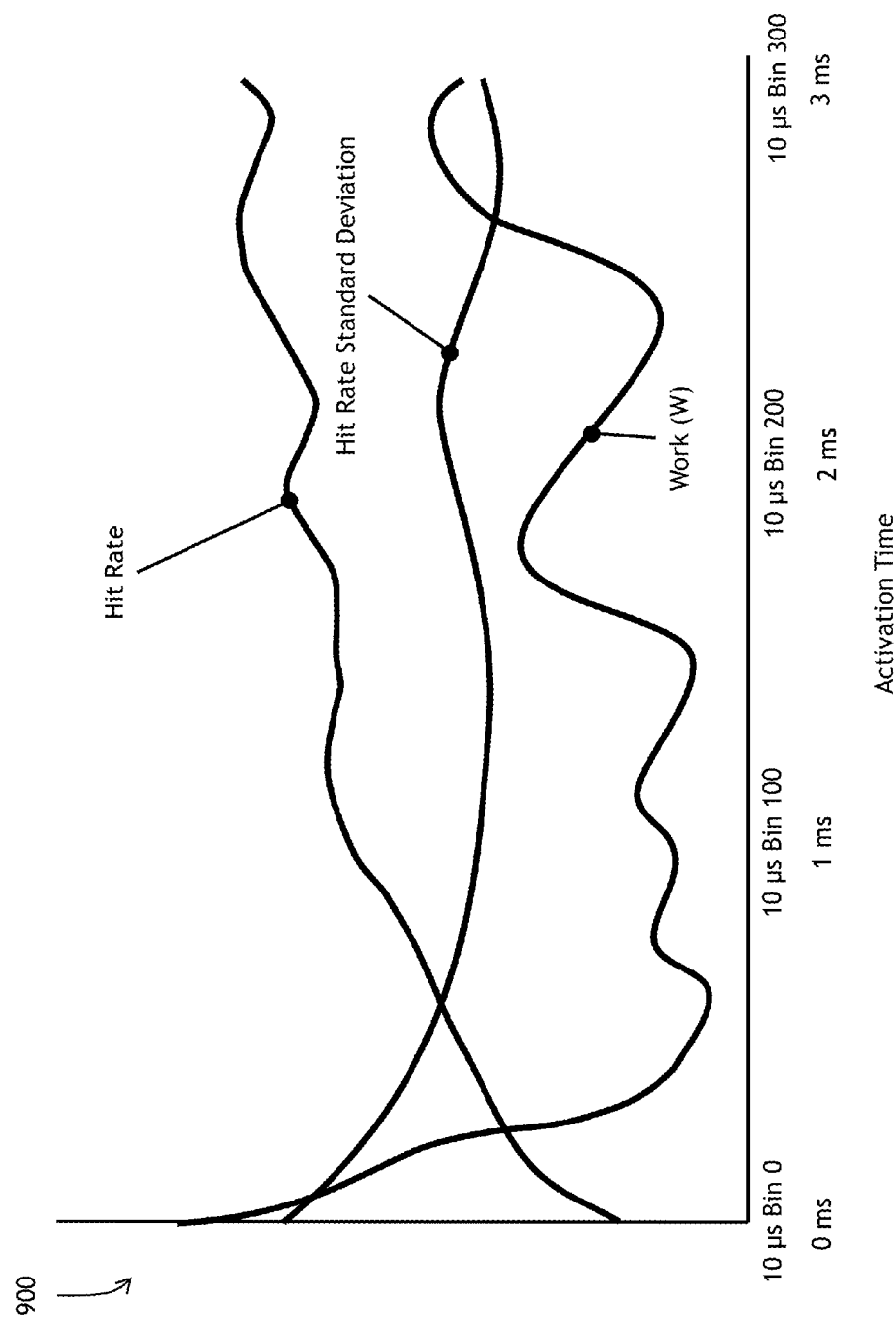
FIG. 9 is a graph of a cache hit rate standard deviation over activation time in accordance with one embodiment of the inventive concepts disclosed herein.

Referring to FIG. 9, a graph of a cache hit rate standard deviation over activation time in accordance with one embodiment of the inventive concepts disclosed herein is shown. A graph of cache hit rate standard deviation 900 may indicate a relationship between work load (W) and cache hit rate over activation time. FIG. 9 illustrates an exemplary 3 ms activation of the HF. The work load W may vary over the course of the activation run. The rate of work may influence the impact of the cache hit rate and standard deviation as a weighting factor when determining the time expended accessing memory.

The system 100 and system 200 may compute $$P_{missGood}, P_{missBad}, W, t_{memAccess}(W, P_{miss}), R_{memAccess}(W, P_{miss})$$

for each 1 ms interval. These values may reflect the mean values over each 1 ms interval of the partition activation time. The system 100 and system 200 may compute:

$$T_{est_{j=Good \text{ or } Bad}} \text{ using } t_{activation} \text{ set to 1 ms.}$$

Total margin is computed by aggregating the three 1 ms periods.

$$\text{margin} = \frac{1 \text{ ms}}{\text{Partition Activation time}} \cdot \sum_{k=1 \text{ ms interval}}^{3rd \text{ 1 ms interval}} \text{margin}_{kth \text{ 1 ms interval}}$$

The system 100 and system 200 may further compute each variable based on a 10 μs interval (bin) during the HF activation time.

Where $T_{est_{j=Good \text{ or } Bad}}$ is computed using $t_{activation}$ set to 10 μs.

Where a margin for the $m^{th}$ 1 ms interval, $\text{margin}_m$, is computed by aggregating the 100 10 μs intervals in the 1 ms period.

$$\text{margin}_m = \frac{10 \text{ }\mu s}{1 \text{ ms}} \cdot \sum_{k=10 \text{ }\mu s \text{ interval}}^{100 \text{ }\mu s \text{ interval}} \text{margin}_{kth \text{ }\mu s \text{ interval}}$$

Figure 10:
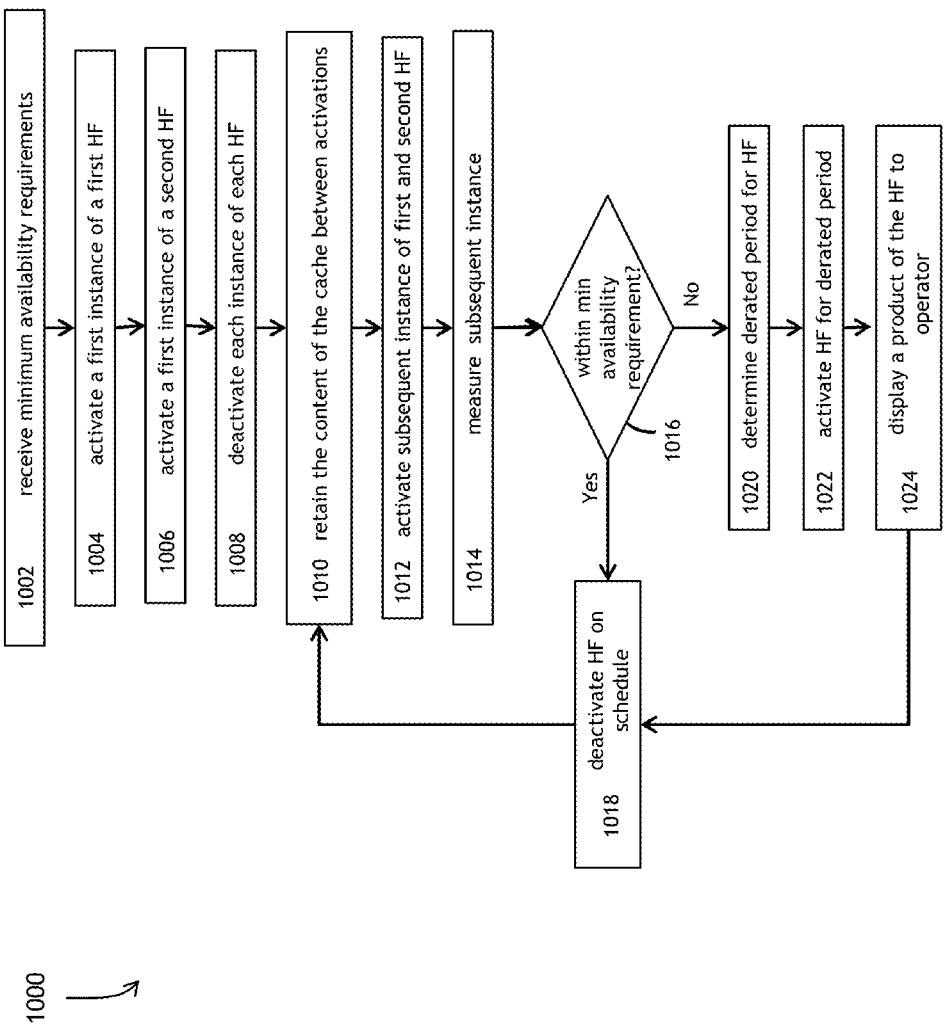
FIG. 10 is a logic flow diagram exemplary of one embodiment of the inventive concepts disclosed herein.

Referring to FIG. 10, a logic flow diagram exemplary of one embodiment of the inventive concepts disclosed herein is shown. Logic flow 1000 may include a step 1002 of receiving a minimum availability requirement for the first and second hosted function and at a step 1004 activating a first instance of the first hosted function for a first period and in compliance with the minimum availability requirement and at a step 1006, activating a first instance of a second HF in compliance with the minimum availability requirement. The logic flow 1000 may also include a step 1008 of deactivating each HF. The logic flow 1000 may also include a step of retaining the content of the cache between each instance activation of each HF and at a step 1012 activating a subsequent instance of the first hosted function and the second hosted function for an individual variable second period.

The logic flow 1000 may further include a step 1014 of measuring each subsequent instance to determine a compliance with the minimum availability requirement. Here, the measuring may include a measurement of a cache hit rate of the data content in the cache. The logic flow may also include a step 1016 of determining if the subsequent instance of the HF is within the minimum availability requirement. If so, the method may reset the HF on schedule at a step 1018 and return to the cache retention step 1010. However, if the subsequent instant is not within the minimum availability requirement, the flow may continue to a step 1020 of determining a derated individual variable period to meet the minimum availability requirements, activating each hosted function at a step 1022 for the derated individual variable period and, at a step 1024 displaying to an operator on the display. The flow may return to retention of the cache at the step 1010 after deactivation of the HF on schedule at the step 1018.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A system for ensuring a minimum required availability of a hosted function, comprising:
   at least one core processor configured for executing a first hosted function and at least one second hosted function:
   a random access memory associated with the at least one core processor and operably coupled with the at least one processor;
   a cache memory associated with the at least one core processor and operably coupled with the at least one processor, the at least one core processor coupled with a display device configured for displaying a product of the first hosted function and the at least one second hosted function;
   a performance monitor associated with the at least one core processor, the performance monitor comprising non-transitory computer readable program code for ensuring a minimum required availability of the first hosted function and the at least one second hosted function, the non-transitory computer readable program code comprising instructions which, when executed by the at least one core processor, cause the at least one core processor to perform and direct the steps of:
   receiving a first minimum availability requirement for the first hosted function;
   receiving a second minimum availability requirement for the at least one second hosted function;
   activating a first instance of the first hosted function, the first instance of the first hosted function activated for a first period and in compliance with the first minimum availability requirement, the first instance writing a first data content to the cache memory and reading the first data content from the cache memory;
   activating a first instance of the at least one second hosted function, each first instance of the at least one second hosted function in compliance with the second minimum availability requirement and writing an additional data content to the cache memory and reading the additional data content from the cache memory;
   deactivating each of the first instance of the first hosted function and the first instance of the at least one second hosted function;
   retaining the first data content and the additional data content within the cache memory;
   activating a subsequent instance of the first hosted function and the at least one second hosted function for an individual variable second period;
   measuring each subsequent instance to determine a compliance with the first minimum availability requirement and the second minimum availability requirement, the measuring including at least a measurement of a reading of one of the first data content and the second data content, and a measurement of a computation rate for each subsequent instance of the first hosted function and the at least one second hosted function;
   determining a derated individual variable period for each of the first hosted function and the at least one second hosted function to meet each of: the first minimum availability requirement and the second minimum availability requirement, the derated individual variable period longer than the first period;
   activating each of the first hosted function and the at least one second hosted function for the derated individual variable period, the activating at least meeting each of: the first minimum availability requirement and the second minimum availability requirement;
   displaying to an operator on the display, the product of at least one of the first hosted function and the at least one second hosted function.

2. The system for ensuring a minimum required availability of a hosted function of claim 1, wherein the at least one core processor further comprises a single core processor and a multiple core processor, the multiple core processor including at least four core processors sharing a common level two cache memory.

3. The system for ensuring a minimum required availability of a hosted function of claim 1, wherein the measuring further includes an unavailability per hour, a probability of failure at each activation, a standard deviation, a cache hit rate margin, and a computed activation time margin.

4. The system for ensuring a minimum required availability of a hosted function of claim 1, wherein activating a subsequent instance of the first hosted function and the at least one second hosted function further comprises activating each hosted function in compliance with a partition schedule.

5. The system for ensuring a minimum required availability of a hosted function of claim 1, wherein the reading the first data content and the additional data content further comprises reading a level two cache of each of the first data content and the additional data content.

6. The system for ensuring a minimum required availability of a hosted function of claim 1, wherein the random access memory is a double data rate random access memory.

7. The system for ensuring a minimum required availability of a hosted function of claim 1, wherein the derated individual variable period is sufficient for operation of the hosted function within compliance with a design assurance level.

8. The system for ensuring a minimum required availability of a hosted function of claim 1, wherein retaining the first data content and the additional data content within the cache memory further includes retaining all of the level one cache and all of the level two cache.

9. The system for ensuring a minimum required availability of a hosted function of claim 1, wherein the performance monitor operates to determine the derated individual variable period for each of the first hosted function and the at least one second hosted function before operation of an aircraft onboard which the system is deployed, and during airborne operation of the aircraft onboard which the system is deployed.

10. The system for ensuring a minimum required availability of a hosted function of claim 1, wherein activating a subsequent instance of the first hosted function and the at least one second hosted function further comprises activation on a schedule based on a system performance requirement.

11. A method for ensuring a minimum required availability of a hosted function, comprising:

receiving a first minimum availability requirement for a first hosted function, the receiving within at least one core processor configured for executing the first hosted function and at least one second hosted function;

receiving a second minimum availability requirement for the at least one second hosted function;

storing each of the first minimum availability requirement and the second minimum availability requirement within a random access memory associated with the at least one core processor and operably coupled with the at least one processor;

activating a first instance of the first hosted function, the first instance of the first hosted function activated for a first period and in compliance with the first minimum availability requirement, the first instance writing a first data content to a cache memory associated with the at least one core processor and operably coupled with the at least one processor and reading the first data content from the cache memory;

activating a first instance of the at least one second hosted function, each first instance of the at least one second hosted function in compliance with the second minimum availability requirement and writing an additional data content to the cache memory and reading the additional data content from the cache memory;

deactivating each of the first instance of the first hosted function and the first instance of the at least one second hosted function;

retaining the first data content and the additional data content within the cache memory;

activating a subsequent instance of the first hosted function and the at least one second hosted function for an individual variable second period;

measuring each subsequent instance via a performance monitor associated with the at least one core processor to determine a compliance with the first minimum availability requirement and the second minimum availability requirement, the measuring including at least a measurement of a reading of one of the first data content and the second data content, and a measurement of a computation rate for each subsequent instance of the first hosted function and the at least one second hosted function;

determining a derated individual variable period for each of the first hosted function and the at least one second hosted function to meet each of: the first minimum availability requirement and the second minimum availability requirement, the derated individual variable period longer than the first period;

activating each of the first hosted function and the at least one second hosted function for the derated individual variable period, the activating at least meeting each of: the first minimum availability requirement and the second minimum availability requirement;

displaying to an operator on a display device operably coupled with the at least one core processor, a product of at least one of the first hosted function and the at least one second hosted function.

12. The method for ensuring a minimum required availability of a hosted function of claim 11, wherein the at least one core processor further comprises a single core processor and a multiple core processor, the multiple core processor including at least four core processors sharing a common cache memory.

13. The method for ensuring a minimum required availability of a hosted function of claim 11, wherein the measuring further includes an unavailability per hour, a probability of failure at each activation, a standard deviation, a cache hit rate margin, and a computed activation time margin.

14. The method for ensuring a minimum required availability of a hosted function of claim 11, wherein activating a subsequent instance of the first hosted function and the at least one second hosted function further comprises activating each hosted function in compliance with a partition schedule.

15. The method for ensuring a minimum required availability of a hosted function of claim 11, wherein the reading the first data content and the additional data content further comprises reading a level two cache of each of the first data content and the additional data content.

16. The method for ensuring a minimum required availability of a hosted function of claim 11, wherein the random access memory is a double data rate random access memory.

17. The method for ensuring a minimum required availability of a hosted function of claim 11, wherein the derated individual variable period is sufficient for operation of the hosted function within compliance with a design assurance level.

18. The method for ensuring a minimum required availability of a hosted function of claim 11, wherein retaining all of the first data content and the additional data content within the cache memory further includes retaining all of the level one cache and all of the level two cache.

19. The method for ensuring a minimum required availability of a hosted function of claim 11, wherein the method operates to determine the derated individual variable period for each of the first hosted function and the at least one second hosted function before operation of an aircraft onboard which the method is deployed, and during airborne operation of the aircraft onboard which the method is deployed.

20. The method for ensuring a minimum required availability of a hosted function of claim 11, wherein activating a subsequent instance of the first hosted function and the at least one second hosted function further comprises activation on a schedule based on a system performance requirement.

* * * * *